July 16, 1935.   J. C. SÉAILLES   2,008,112

PROCESS FOR OBTAINING ALUMINA

Filed July 27, 1933

Inventor
Jean Charles Séailles
By Bailey & Larson
Attorney

Patented July 16, 1935

2,008,112

UNITED STATES PATENT OFFICE 2,008,112

PROCESS FOR OBTAINING ALUMINA

Jean Charles Séailles, Paris, France

Application July 27, 1933, Serial No. 682,529
In Belgium July 30, 1932

7 Claims. (Cl. 23—143)

My invention relates to processes for obtaining alumina.

The object of my invention is to provide a process of that kind that makes it possible to lower the price of the final product and eventually to improve its quality, while simplifying the operations involved by said process, in particular by eliminating the action of soda.

To this effect, according to my invention, I first exhaust with water an aluminate of lime or a mixture of aluminates of lime, previously prepared through a known process; then I precipitate from the solution thus obtained either aluminia or both alumina and lime, by a suitable reagent.

Figure 1:
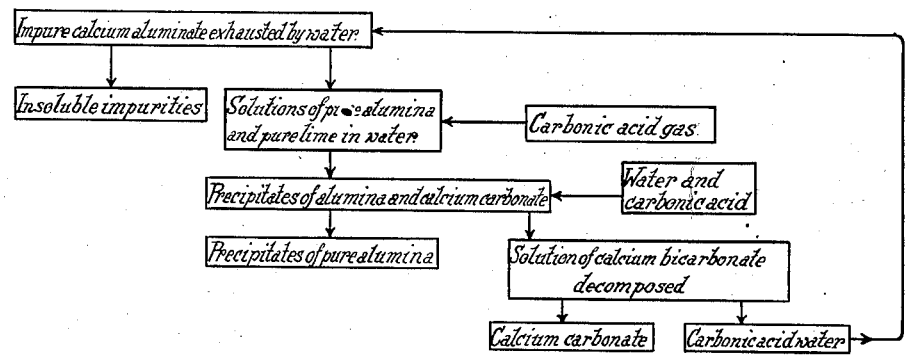
Figure 2:
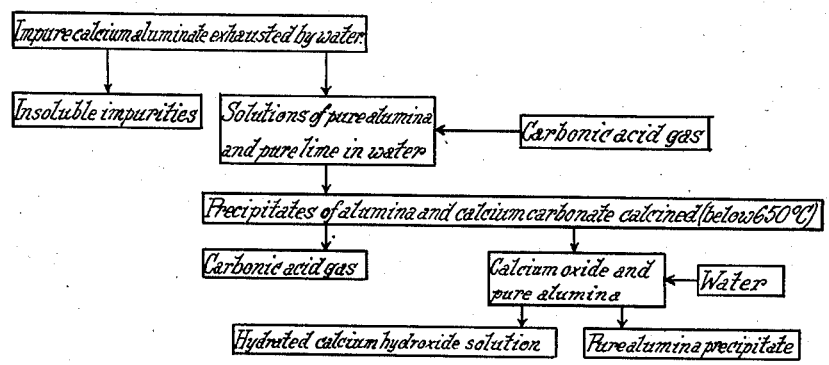

Other features of my invention will appear from the following detailed description thereof, given merely by way of example, and the annexed drawing which forms a part of the description, and in which Figs. 1 and 2 are flow sheets showing two modifications of my process.

According to my invention, in order to obtain alumina, I make use as raw material of aluminates of lime obtained either in the anhydrous or in the hydrated state, through one of the known processes, for instance through the processes based on the treatment of the mineral by means of lime by the wet method in an autoclave, such as are more especially described in French Patents Nos. 634,430 and 649,027.

According to my invention, said aluminates are exhausted with water so as to obtain a solution which is then treated by a reagent permitting to precipitate either alumina alone or both alumina and lime, in which case these two bodies are subsequently separated from each other through any suitable means.

My invention is based on the experimental fact that aluminates of lime are soluble in water in a given proportion which varies according to the nature of the aluminate and according to the time for which it is left in contact with water. It is easy to obtain, with times of contact not exceeding some minutes, solubilities ranging between 0.2 and 2.3 grammes of alumina per litre of water, a corresponding quantity of lime being dissolved in a proportion that varies generally between one and two molecules of lime for one molecule of alumina dissolved. This solution occurs according to the equation:

$$Al_2O_3.nCaO + pH_2O = Al_2O_3 + CaO + nH_2O,$$

both alumina and lime being pure in solution.

In order to precipitate alumina from the aluminates, it suffices to have recourse to carbonic acid, in which case both alumina and lime are precipitated, said bodies being subsequently separated from each other. The reaction takes place according to the equation:

$$Al_2O_3 + CaO + 3H_2O + CO_2 = Al_2O_3.3H_2O + CaCO_3,$$

both hydrated alumina and calcium carbonate being in the form of precipitates. The latter method is particularly economical.

As for the method of separating from each other the precipitates of alumina and lime obtained when carbonic acid is utilized (or obtained through any other method involving the simultaneous precipitation of alumina and lime) it may be as follows:

I may have recourse to the action of an acid capable of removing lime without acting on the alumina (for instance diluted hydrochloric acid) eventually after a slight calcination of the precipitates for dehydrating the alumina.

I may also calcine the precipitate, not only so as to dehydrate alumina, but also in such a manner as to transform the calcium carbonate into lime which can then be eliminated by a simple washing with water (Fig. 2).

The equations for this reaction are:

$$Al_2O_3.3H_2O + CaCO_3 = Al_2O_3 + CO_2 + CaO + 3H_2O,$$
$$Al_2O_3 + CaO + nH_2O = Al_2O_3 + Ca(OH)_2.nH_2O,$$

alumina remaining in the state of precipitate and hydrated calcium hydroxide being dissolved.

Finally and preferably, I may also make use of the property of water containing carbonic acid of dissolving lime (which is probably transformed into calcium bicarbonate) (Fig. 1).

The reaction involved is as follows:

$$Al_2O_3.3H_2O + CaCO_3 + H_2O + CO_2 = Al_2O_3.3H_2O + CaC_2O_5.$$

In a general manner, and more especially in the case of lime and alumina being separated by the last mentioned method, it will be advantageous to perform the whole of the treatment of the aluminates of lime in a closed circuit, the same water being reutilized after purification according to the following cycle:

1. Dissolution of $Al_2O_3$ and $CaO$ from the aluminate in water; according to the equation:

$$Al_2O_3.CaO + nH_2O = Al_2O_3 + CaO + nH_2O,$$

alumina and lime being present in the pure state in solution.

2. Simultaneous precipitation of $Al_2O_3$ and $CaO$ by $CO_2$ reacting on said solution as follows:

$$Al_2O_3 + CaO + 3H_2O + CO_2 = Al_2O_3.3H_2O + CaCO_3,$$

both hydrated alumina and calcium carbonate being in the state of precipitates.

3. Treatment of the precipitate by water containing $CO_2$ so that $CaO$ is dissolved and alumina is separated; the equations for this reaction are:

$$Al_2O_3.3H_2O + CaCO_3 + 3H_2O + CO_2 =$$
$$Al_2O_3.3H_2O + CaC_2O_5$$
$$CaC_2O_5 = CaCO_3 + CO_2.$$

4. Precipitation in the same water, of $CaO$ in the state of carbonate and elimination of $CO_2$, dissolved through any suitable means such as the action of $CaO$, the action of vacuum, etc.

5. Complementary purification of the water that has been used, if this is necessary, said water being then reintroduced into the cycle.

Of course the installation necessary for carrying out such a process will comprise all the known apparatus for the production of $CO_2$ and its washing.

My process involves the use of masses of water that are not excessive. With the solubility above indicated, it is found that 1000 cubic metres of water, flowing at the rate of 70 cubic metres per minute, would permit of dissolving from 800 to 9200 kilogrammes of alumina per hour, i. e., from 19,200 to 220,000 kilogrammes per diem, which means that in the latter case 22 tons per diem would be dissolved by means of 100 cubic metres of water circulating at the rate of 7000 litres per minute, or 120 litres per second.

In each case, the precipitate of alumina that is obtained can be subjected to a complementary purification if that is necessary, for instance to the action of hydrochloric acid that would absorb the traces of $CaO$.

Finally, of course, the various operations above described may comprise, if necessary, the utilization of heat or of pressure, or both these factors in combination.

I preferably start from anhydrous aluminate of lime of the kind existing in aluminate cements or clinkers comprising for instance aluminate in the state of mono-calcic aluminate $Al_2O_3$, $CaO$, or of more calcic aluminate such for instance as $3Al_2O_3, 5CaO$.

The clinker previously crushed is treated by water at ordinary temperature, and preferably at a temperature ranging between 25 and 35° C.

Alumina and lime are dissolved in proportions varying with the duration of contact, and the fineness of the pulverization. But it is easy to obtain solutions containing from 0.5 to 3 grammes of alumina per litre with a relatively short duration of contact, ranging generally between some minutes and half an hour. However, these values should not be considered as limits because it is possible to systematically exhaust the alumina with water by known processes, and the duration of contact depends naturally on the ratio of the masses of water and of the crushed material that are maintained in presence, and also on the efficiency of the stirring and on the temperature.

It has been found that good results could be obtained without any complication by treating for a quarter of an hour 1,665 kilogrammes of pulverized clinker by one cubic metre of water that has already been used for treating by counter-current circulation the residues of washing for systematically exhausting them.

The water that has served to the treatment of the clinker contains in this case 670 grammes of alumina per cubic metre for a clinker containing 47% of $Al_2O_3$, and the yield in weight is:

$$\frac{1.665 \times 0.47}{0.670} = 85.62\%$$

Besides, it will be noted that the yield varies necessarily with the percentage of silica in the clinker, because said silica might render a portion of the alumina insoluble, for instance in the state of gehlenite $SiO_2, Al_2O_3, 2CaO$.

This water charged with alumina contains a proportion of lime corresponding approximately to one molecule of lime for one molecule of $Al_2O_3$.

After filtration, the carbonic acid is admitted and lime and alumina precipitate simultaneously, but the lime quickly dissolves again in the presence of an excess of carbonic acid.

If the quantity of lime does not exceed the quantity that is soluble in the mother water, the residue consisting of very pure alumina contains only traces of iron, silica and lime.

If, on the contrary, lime is in excess, the precipitate still contains lime which can be eliminated by a subsequent washing either with water charged with $CO_2$ or with water containing a suitable amount of hydrochloric acid.

When precipitation has taken place, the water charged with bicarbonate can be regenerated by the known processes, for instance either by extracting $CO_2$ by the action of heat or of vacuum in order to precipitate the calcium carbonate, or by eliminating it by means of lime, or again by combining the two treatments.

Of course the carbonic acid extracted can be reintroduced into the cycle of the process.

As for the precipitated calcium carbonate, it may be either reutilized after calcination with recovery of the lime, or constitute a sub-product that may be sold or utilized in any other way.

From an industrial point of view, it should first be noted that the process according to the invention makes it possible to obtain alumina at a very low cost, since the products that are made use of are very cheap.

With proportions averaging 500 grammes of alumina per cubic metre and a circulation at a rate corresponding to a duration of contact of one quarter of an hour, the yield is theoretically 48 kilogrammes per diem. Even if account be taken of the margin to be allowed for in industrial organizations, it still remains that the volumes worked upon remain very acceptable and much smaller than those required for instance by the Bayer process, in which the operations are very slow so that although it bears on more concentrated liquors, said Bayer process finally requires enormous volumes to be treated.

It should further be noted that with the process according to my invention, it becomes possible to utilize minerals such as siliceous bauxites since, instead of fixing silica by means of soda, which is very expensive, it is fixed in this case by lime which is ten or fifteen times less expensive.

My invention also permits to directly obtain a mixture of alumina and calcium carbonate, which mixture could be utilized without any purification, for instance for the manufacture of lacs, abrasive products, sulphate of alumina and other bodies which for many applications can include a certain amount of calcium sulphate without any inconvenience.

This mixture can also be used for manufacturing barium aluminate intended for the purification of water.

In a general manner, it will be seen that the process of obtaining alumina according to my invention is considerably simpler and therefore less expensive than those used up to the present time.

It should also be noted that the alumina precipitated by the processes which have been referred to, especially when they are performed in the cold state, is, and remains, much more easily soluble in acids than ordinary alumina, and for instance that obtained by the Bayer process, which is particularly interesting for the manufacture of sulphate of alumina, for instance.

Furthermore, the alumina when it is obtained through the action of soda, is not soiled by sodic residues as in other processes.

What I claim is:

1. A process of obtaining alumina which comprises exhausting aluminate of lime with water, treating the solution thus obtained by a reagent capable of precipitating alumina and lime, and purifying this mixed precipitate so as to leave only alumina.

2. A process of obtaining alumina which comprises exhausting aluminate of lime with water, treating the solution thus obtained with carbonic acid, and treating the precipitate thus obtained by an acid capable of removing the lime present therein without acting on alumina.

3. A process according to claim 2 further characterized in that the acid for treating the precipitate is constituted by diluted hydrochloric acid.

4. A process of producing alumina which comprises exhausting aluminate of lime, precipitating the lime and alumina from the solution thus obtained by treating it with carbonic acid, calcining the precipitate thus obtained in such manner not only to dehydrate the alumina, but also to transform calcium carbonate into lime, and eliminating said lime by washing it out with water.

5. A process of combining alumina which comprises exhausting aluminate of lime with water, precipitating lime and alumina from the solution thus obtained by treating it with carbonic acid, and treating the precipitate thus obtained by water charged with carbonic acid so as to dissolve the lime.

6. A process of obtaining alumina which comprises in combination, exhausting aluminate of lime with water so as to dissolve aluminate of lime, precipitating alumina and lime from the solution thus obtained by treating it with carbonic acid, treating the precipitate thus obtained by water charged with carbonic acid so as to dissolve the lime as bicarbonate, precipitating bicarbonate of lime present in said water, and eliminating the carbonic acid dissolved in said water so that said water may again be utilized for repeating the cycle above described.

7. A process of obtaining alumina which comprises exhausting aluminate of lime with water, treating the solution thus obtained with carbonic acid, for precipitation of alumina and lime, slightly calcining this mixture of alumina and lime, and eliminating lime by washing with water.

JEAN CHARLES SÉAILLES.